US008592708B2

(12) United States Patent
Hatanaka et al.

(10) Patent No.: US 8,592,708 B2
(45) Date of Patent: Nov. 26, 2013

(54) GAS-INSULATED VACUUM CIRCUIT BREAKER

(75) Inventors: Hayato Hatanaka, Hitachi (JP); Teyon Shin, Hitachi (JP); Masahiko Fujita, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 196 days.

(21) Appl. No.: 13/321,026

(22) PCT Filed: Apr. 26, 2010

(86) PCT No.: PCT/JP2010/057912
§ 371 (c)(1),
(2), (4) Date: Nov. 17, 2011

(87) PCT Pub. No.: WO2010/134442
PCT Pub. Date: Nov. 25, 2010

(65) Prior Publication Data
US 2012/0061353 A1 Mar. 15, 2012

(30) Foreign Application Priority Data
May 18, 2009 (JP) ................................ 2009-120034

(51) Int. Cl.
*H01H 33/02* (2006.01)
(52) U.S. Cl.
USPC .............................. 218/153; 218/16; 218/140
(58) Field of Classification Search
USPC ............................................ 218/16, 140, 153
See application file for complete search history.

(56) References Cited

U.S. PATENT DOCUMENTS

| 5,905,242 A  * | 5/1999  | Bernard et al. ................... 218/16 |
| 6,268,579 B1 * | 7/2001  | Kajiwara et al. ............... 218/153 |
| 6,529,009 B2 * | 3/2003  | Kikukawa et al. .............. 324/424 |
| 7,310,221 B2 * | 12/2007 | Lammers ....................... 361/632 |
| 7,563,161 B2 * | 7/2009  | Perret .............................. 463/13 |

FOREIGN PATENT DOCUMENTS

| JP | 50-99463    | 8/1975  |
| JP | 51-5509     | 1/1976  |
| JP | 57-36736    | 2/1982  |
| JP | 6-208820    | 7/1994  |
| JP | 2005-323499 | 11/2005 |
| JP | 2006-187195 | 7/2006  |

OTHER PUBLICATIONS

International Search Report from International Application No. PCT/JP2010/057912, mailed Jun. 8, 2010.

* cited by examiner

*Primary Examiner* — Truc Nguyen
(74) *Attorney, Agent, or Firm* — Brundidge & Stanger, P.C.

(57) ABSTRACT

Sealed chamber for monitoring pressure 23 is provided on sealed tank 37. Sealed tank 37 is filled with insulating gas. And, a connection using insulated pipe 19 is provided between medium-pressure space 18 that makes a medium pressure and sealed chamber for monitoring pressure 23. In sealed chamber for monitoring pressure 23, a pressure monitoring and controlling means is provided for monitoring the internal pressure thereof to activate the pressure-release control in response to the situation where the monitored internal pressure has reached the predetermined setting value. The pressure monitoring and controlling means includes solenoid valve 28 that is capable of opening sealed chamber for monitoring pressure 23 to the atmosphere, pressure detector 26 that detects the internal pressure, and pressure monitor 27, which activates solenoid valve 28 for pressure-release when pressure detector 26 detects that the internal pressure has reached the predetermined abnormal pressure value.

2 Claims, 3 Drawing Sheets

GAS-INSULATED VACUUM CIRCUIT BREAKER

TECHNICAL FIELD

The present invention relates to a gas-insulated vacuum circuit breaker including a vacuum valve arranged in a sealed tank that is filled with insulating gas.

BACKGROUND ART

It is generally known that electric power stations such as power plants and substations use gas-insulated breakers having a construction such that high-voltage conductors are arranged in a sealed tank filled with insulating gas at a pressure of several-atmosphere and the conductors are electrically insulated from the tank. It is also known that gas-insulated vacuum circuit breakers using vacuum valves are used instead of usual kind of gas-insulated switchgears that are usually used.

The vacuum valve has a pair of openable electrodes accommodated in a vacuum tank kept in a vacuum state and a bellows that prevents the vacuum-leakage of the vacuum tank attributable to the opening movement of the movable electrode while permitting the opening movement of the movable electrode. Because of this configuration, when the vacuum valve is arranged in the sealed tank filled with insulating gas, the bellows is subjected to the vacuum pressure of the vacuum tank on one surface thereof and is subjected to the pressure of the insulating gas filled in the sealed tank on the other surface thereof. This produces difference in pressure between the outside and the inside of the bellows, possibly resulting in shortening the mechanical life of that bellows.

For reduction of the magnitude of such pressure difference applying on the bellows, JP 2005-323499 A1 (Patent Literature 1) has proposed a gas insulated switching device. In the proposed switching device, a vacuum tank kept in a vacuum state is separated, by a pair of bellows, from a sealed container filled with insulating gas; an intermediate room is formed between such pair of bellows; and such intermediate room is pressurized at an intermediate pressure condition between the vacuum pressure of the vacuum tank and the pressure of the insulating gas filled in the sealed container; or instead of providing such intermediate room, the other side of the bellows that holds the degree of vacuum of the vacuum tank is made open to the atmosphere.

JP 06-208820 A1 (Patent Literature 2) has proposed a gas insulated vacuum circuit breaker. In the proposed circuit breaker, an intermediate room is provided on the other side of the bellows that holds the degree of vacuum of the vacuum tank, and such intermediate room is pressurized at an intermediate pressure condition between the vacuum pressure of the vacuum tank and the pressure of the insulating gas filled in the sealed tank.

However, use of a paired bellows in the conventional gas insulated vacuum circuit breaker causes a vacuum valve to be expensive. It is therefore preferable to reduce the difference in pressure between pressures applying on both surfaces of the bellows by use of one bellows. On the other hand, opening the other side of the bellows directly to the atmosphere as Patent Literature 1 describes invites ingress of moisture from the atmosphere and consequently the creeping dielectric strength of the insulator, for example, will be lowered.

In the meantime, when an intermediate room is provided on the other side of the bellows like an example as described in Patent Literature 2, a current collector, which maintains electrical contact with a movable conductor shaft, is installed in the intermediate room. This configuration requires that the current collector should be positioned within the intermediate room over the full-stroke of the switching movements of the movable electrode and the movable conductor shaft. This causes the intermediate room to enlarge greatly its size in the direction of the switching movements and, as a result of this, the gas-insulated vacuum circuit breaker becomes a large apparatus.

An attempt to reduce the size of the intermediate room in the direction of the switching movements means that the movable conductor shaft, the surface of which is roughened or scratched due to sliding contact with the current collector, should pass a gastight holding part provided for prevention of the leakage of the insulating gas filled in the sealed tank, which accommodates the vacuum valve, into the intermediate room. In this construction, there is a risk of a small leakage occurring intermittently or continuously over a long period of time through the gastight holding part attributable to the switching movements of the vacuum circuit breaker. With this case, the internal pressure of the intermediate room gradually rises and reaches an abnormal pressure value inviting a risk of an increased pressure difference between the inside and the outside of the bellows.

An object of the present invention is to provide a gas-insulated vacuum circuit breaker that is configured so that the rise in the pressure in a medium-pressure space, which is provided for the lowering of pressure difference between inner and outer pressure value applying on the bellows, attributable to a small leakage at the airtight holding part will not reach the abnormal pressure value.

DISCLOSURE OF INVENTION

To attain the above-stated object, the present invention provides a gas-insulated vacuum circuit breaker including: a sealed tank being filled with insulating gas; a vacuum valve being arranged in the sealed tank, the vacuum valve including a movable electrode, a fixed electrode, a bellows and the vacuum tank and opening the movable electrode from the fixed electrode maintaining vacuum condition within the bellows; a medium-pressure space being arranged in the sealed tank, the medium-pressure space applying pressure on one surface of bellows that is the other surface of the bellows on which vacuum pressure being applied, the medium-pressure space being maintained to an intermediate pressure condition between the pressure of the insulating gas filled in the sealed tank and the vacuum pressure; a sealed chamber for monitoring pressure being provided on the sealed tank to monitor the gas pressure; an insulated pipe being installed between the sealed chamber for monitoring pressure and the medium-pressure space connecting therebetween; and a pressure monitoring and controlling means being installed in the sealed chamber for monitoring pressure. Further, the pressure monitoring and controlling means monitors the internal pressure thereof and controls pressure-release control in response to the situation where the monitored internal pressure has reached the predetermined setting value.

It is preferable that the pressure monitoring and controlling means includes a solenoid valve, a pressure detector, and pressure monitor. Further, the solenoid valve open the sealed chamber for monitoring pressure to the atmosphere, the pressure detector detects the internal pressure of the sealed chamber for monitoring pressure, the pressure monitor opens the solenoid valve when the pressure detected by the pressure detector reaches a predetermined abnormal pressure value.

Advantages of the Invention

In the gas-insulated vacuum circuit breaker by the present invention, the rise of the internal pressure of the medium-pressure space caused due to some reasons can be monitored by the pressure monitoring and controlling means as the variation of the internal pressure of the sealed chamber for monitoring pressure that is connected with the medium-pressure space through the insulated pipe. Thus, the internal pressure of the medium-pressure space can be maintained at an intermediate pressure condition between the vacuum pressure of the vacuum tank and the pressure of the insulating gas filled in the sealed tank, because the internal pressure of the sealed chamber for monitoring pressure can be released into the atmosphere by a pressure-release control in response to the situation where the monitored internal pressure of the sealed chamber for monitoring pressure has reached the predetermined setting value. As a result of this, the difference in pressure on the bellows is reduced and consequently the mechanical life thereof will be lengthened. Further, in this configuration, the medium-pressure space and the sealed chamber for monitoring pressure can be arranged dispersedly and consequently the axial dimension of the movable conductor shaft in the medium-pressure space will be shortened with a result of the down-sizing being practicable.

BEST MODE FOR CARRYING OUT THE INVENTION

Embodiment 1

Figure 1:
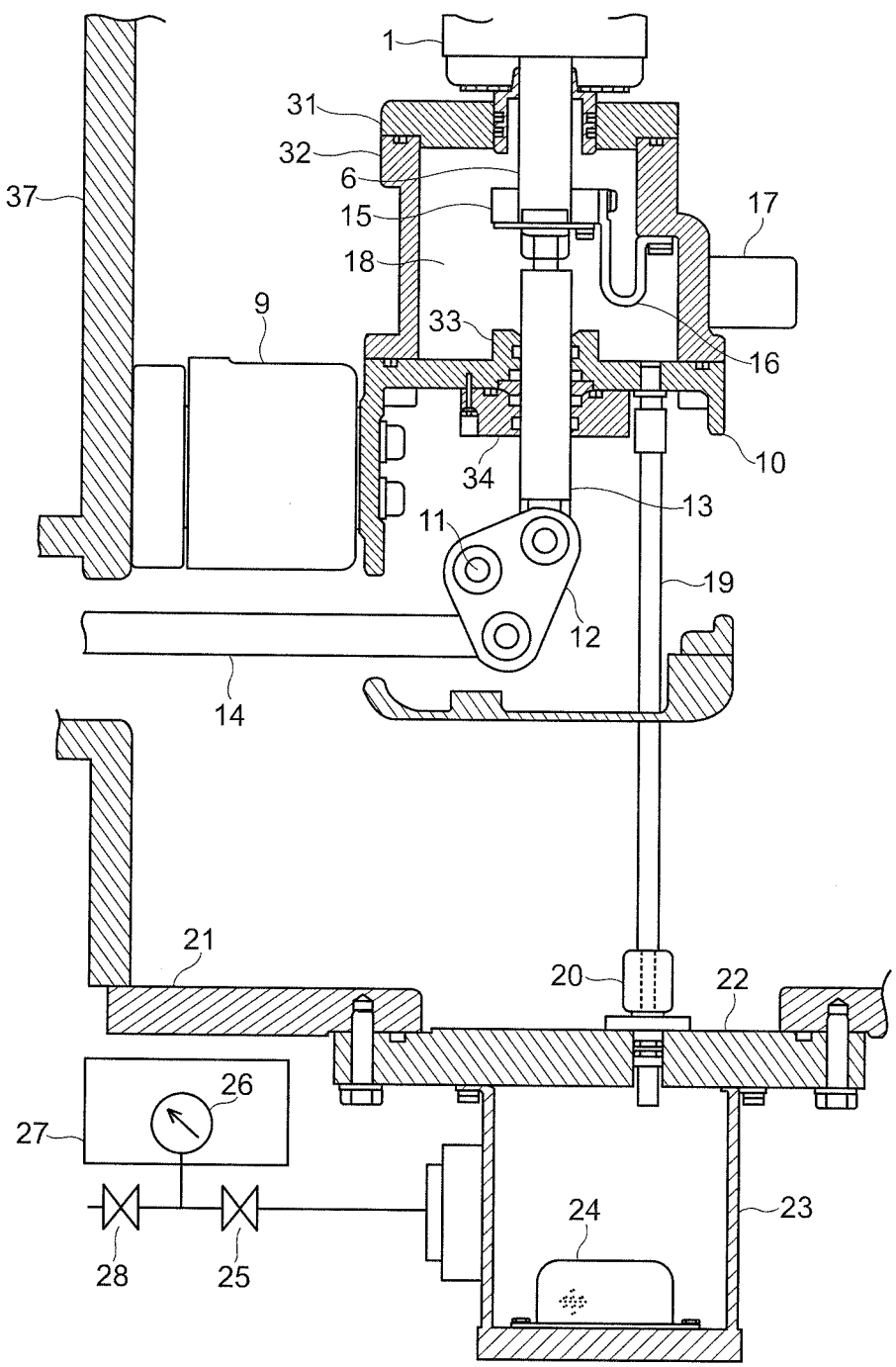
FIG. 1 is a sectional view of the gas-insulated vacuum circuit breaker in an embodiment of the present invention.
Figure 2:
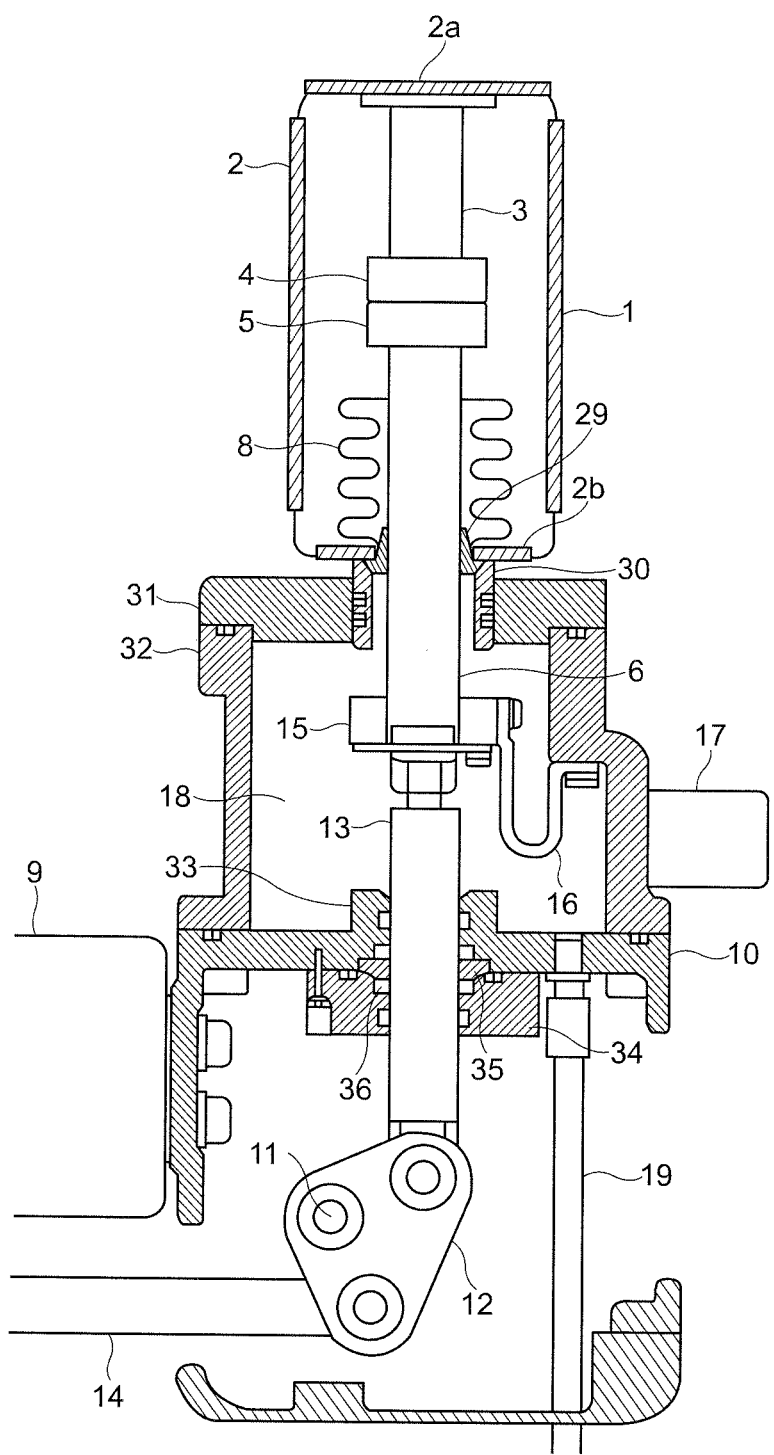
FIG. 2 is an enlarged sectional view of the principal part of the gas-insulated vacuum circuit breaker illustrated in FIG. 1.

The following explains an embodiment, which is illustrated in FIGS. 1 and 2, of a gas-insulated vacuum circuit breaker by the present invention.

As FIG. 2 illustrates, a vacuum valve 1 is arranged in a sealed tank (not illustrated) filled with insulating gas compressed to a pressure of several-atmosphere, being insulated electrically from the sealed tank.

The vacuum valve 1 comprises a vacuum tank 2 the inside of which is kept vacuum. The vacuum valve 1 includes an end flanges 2a and 2b that hermetically seal both of axial ends of the vacuum tank 2, a fixed electrode 4 fixed on the end flange 2a of the vacuum tank 2 via an fixed conductor shaft 3, a movable electrode 5 that is openable from the fixed electrode 4, a movable conductor shaft 6 supporting the movable electrode 5 and being led out of the vacuum tank 2, and a bellows 8 installed between the end flange 2b and the movable conductor shaft 6 so that the vacuum of the vacuum tank 2 will be maintained being protected from a vacuum-leakage that the switching movements of the movable electrode 5 will cause.

The vacuum valve 1 and a high-voltage conductor are accommodated in the sealed tank (not illustrated). On the inner face of the wall of the sealed tank, an insulating support 9 is installed with one end fixed thereon. On the other end of the insulating support 9, a cylindrical supporting member 10 formed in a sleeve-like shape is fixed. The cylindrical supporting member 10 supports the movable conductor shaft 6 of the vacuum valve 1 in such a manner that switching movements of the movable conductor shaft 6 will not be disturbed.

Inside the cylindrical supporting member 10, a lever 12 having a rotary shaft 11 both ends of which are rotatably supported on the cylindrical supporting member 10 is installed. To one end of the lever 12, the movable conductor shaft 6 is mechanically linked through a connecting shaft 13. To the other end of the lever 12, an operating mechanism (not illustrated) is linked through an insulative operating rod 14.

The connecting shaft 13 is screw-coupled with the movable conductor shaft 6. One end of a flexible conductor 16 having enough flexibility is connected with a connecting conductor 15 that is connected electrically with the periphery of the movable conductor shaft 6 located around such screw-coupled portion.

The other end of the flexible conductor 16 is connected, using a screw, to the inner face of the wall of a cylindrical member for medium-pressure space 32, of which details will be described later. The flexible conductor 16 is given such a length that there is a marginal length when each of the both ends thereof are fixed on the movable conductor shaft 6 and the cylindrical member for medium-pressure space 32 respectively. Further, the flexible conductor 16 is supported by the connecting conductor 15 so that no interference will occur even when movable parts located close thereto such as the movable conductor shaft 6 moves in the switching directions.

Thereby, the flexible conductor 16 maintains a good electrical contact between the movable conductor shaft 6 and the cylindrical member for medium-pressure space 32, following the movement of the movable conductor shaft 6 in the switching directions with its flexibility.

The vacuum valve 1 stated above is connected with the high-voltage conductor (not illustrated) that forms the main circuit. The high-voltage conductor forming the main circuit connects a terminal fitting 17 to the cylindrical member for medium-pressure space 32 for example. The terminal fitting 17 and the movable electrode 5 of the vacuum valve 1 are connected electrically through the movable conductor shaft 6, the flexible conductor 16, and the cylindrical member for medium-pressure space 32: the connection extends finally to the terminal fitting 17.

On the periphery of the bellows 8 of the vacuum valve 1, the vacuum pressure of the vacuum tank 2 applies. However, it is configured not so that the pressure of the insulating gas filled in the sealed tank (not illustrated) will directly apply inside the bellows 8, but so that an intermediate pressure condition between the filled-pressure of the insulating gas and the vacuum pressure will apply.

Therefore, a medium-pressure space 18, which connects with the room formed on the inner face side of the bellows 8, is provided. The medium-pressure space 18 is formed in a manner separated from the surrounding insulating gas and, as will be detailed later, maintained to an intermediate pressure condition between the filled-pressure of the insulating gas and the vacuum pressure, namely maintenance at the atmospheric pressure.

Next, an explanation of forming the medium-pressure space 18 follows.

On the end flange 2b that seals the lower end of the vacuum tank 2 of the vacuum valve 1, a guide-member 29 for guiding the movable conductor shaft 6 along its axis line on switching movements contacting slidably with the periphery thereof and an inner cylindrical member 30 arranged coaxially with respect to the movable conductor shaft 6 at a position slightly remote from the periphery thereof are fixed integrally. On the periphery of the inner cylindrical member 30, an upper end plate 31 is installed sandwiching a gastight holding element like an 0-ring therebetween.

As stated above, the cylindrical member for medium-pressure space 32 is disposed in the area that surrounds the mechanical linking portion between the movable conductor shaft 6 and the connecting shaft 13. To form the medium-pressure space 18 using the cylindrical member for medium-pressure space 32, the lower end of the cylindrical member for medium-pressure space 32 is bolted (bolts are not illustrated) on the upper face of the cylindrical supporting member 10 sandwiching a gastight holding element therebetween and the upper end of the cylindrical member for medium-pressure space 32 is bolted (bolts are not illustrated) on the underface of the upper end plate 31 sandwiching a gastight holding element.

Further, a structure is provided to maintain airtightness of the medium-pressure space 18 protecting from an airtightness disturbance that the switching movements of the connecting shaft 13 will cause. For this purpose, the cylindrical supporting member 10 located underneath the cylindrical member for medium-pressure space 32 has an end plate portion 33 thereon. Further, the end plate portion 33 is installed slidably on the periphery of the connecting shaft 13, seals the lower end face of the cylindrical member for medium-pressure space 32, and guides the movement of the connecting shaft 13.

On the underface of the end plate portion 33, a lower hermetic sealing plate 34, which is installed slidably on the periphery of the Connecting shaft 13 to guide the movement thereof, is installed; the lower hermetic sealing plate 34 is bolted on the underface of the end plate portion 33.

Between the end plate portion 33 and the lower hermetic sealing plate 34, a lubricant supplying member 35 for providing the periphery of the movable conductor shaft 6 with a hermetic sealing therebetween and a gastight holding element 36, which is installed on the both sides of the lubricant supplying member 35 to receive lubricant supply, are installed.

Thus, the medium-pressure space 18 is formed in which the medium-pressure space 18 is a space having a connection with the space inside the bellows 8 through the sliding portion between the movable conductor shaft 6 and the guide-member 29 but is separated hermetically from the insulating gas filled in the sealed tank (not illustrated), which accommodates constituting members such as the vacuum valve 1 as illustrated.

The medium-pressure space 18 is further formed so as to maintain airtightness even while the vacuum valve 1 is on the switching movements. To attain this function, the cylindrical member for medium-pressure space 32 is manufactured so as to have such an axial length as can accommodate the mechanical linking portion between the movable conductor shaft and the connecting shaft 13; and the end plate portion 33 provided on the lower end face of the cylindrical member for medium-pressure space 32 and the lower hermetic sealing plate 34 are arranged so that the periphery of the connecting shaft 13, not the movable conductor shaft 6, will be sealed hermetically.

Thereby, the volume of the medium-pressure space 18 formed inside the cylindrical member for medium-pressure space 32 can be made large enough compared to the space formed inside the bellows 8. Therefore, the increase in the internal pressure of the medium-pressure space 18 will occur very little even though the volume of the space formed inside the bellows 8 varies due to a deformation attributable to the switching movements of the vacuum valve 1.

Further, because of that, as stated above, the medium-pressure space 18 is made to have such a large enough volume, it becomes easy to arrange the flexible conductor 16, which connects electrically the movable conductor shaft 6 with the terminal fitting 17, within the cylindrical member for medium-pressure space 32. Moreover, such electrical connection configuration ensures that the gastightness of the medium-pressure space 18 is maintained with ease.

This means that, although the electrical connection in such situation may be applicable alternatively by use of a current collector instead of using the flexible conductor 16, installing a current collector, which contacts the periphery of the connecting shaft 13 with a pressure, may change the property of the gastight holding element 36 because of heat generated by current flowing the connecting shaft 13 causing loss of gastightness. In addition, scratch on the periphery of the connecting shaft 13 due to sliding contact with the current collector will come to lower the sealing effect of the gastight holding element 36 that maintains the gastightness of the medium-pressure space 18. Further, the contact pressure of the current collector can invite the increasing of the load on the operating mechanism on switching movements.

In contrast, where the flexible conductor 16 is used instead of the current collector, the sliding portion will not be formed on the movable conductor shaft 6 nor on the periphery of the connecting shaft 13. Further, the use of the flexible conductor 16 eliminates damaging the periphery of the movable conductor shaft 6 or of connecting shaft 13, or produces no metallic powder from such surface. Therefore, the gastight holding element 36 can maintain the gastightness of the medium-pressure space 18 always in a good condition. Moreover, the increase in the load on the operating mechanism due to the contact pressure of the current collector will no longer occur, unlike the case that uses the current collector.

Next, an explanation will be provided referring to FIG. 1, which illustrates the overall configuration, with regard to the configuration for pressurization of the medium-pressure space 18 formed as stated above to an intermediate pressure condition between the pressure of the insulating gas filled in the sealed tank (not illustrated) and the vacuum pressure of the vacuum valve 1.

The vacuum valve 1 stated above is arranged in a sealed tank 37 filled with insulating gas at a pressure of several-atmosphere. The movable conductor shaft 6 of the vacuum valve 1 fixes the cylindrical supporting member 10 on the other end of the insulating support 9, one end of which is fixed on the inner face of the sealed tank 37.

In the cylindrical supporting member 10, an insulated pipe 19 is arranged. One end of the insulated pipe 19 is inserted into the penetration hole provided on the end plate portion 33 to have a connection with the medium-pressure space 18 stated above. Further, the insulated pipe 19 is led out from the lower end of the cylindrical supporting member 10 so that the other end thereof will communicate with the upper end of a connection plug 20.

The connection plug 20 penetrates into the through hole formed on a sealing plate 22 that is hermetically connected to a bottom flange 21. The both ends of the insulated pipe 19 are hermetically connected so as not to cause ingress of the insulating gas in the sealed tank 37 into the medium-pressure space 18.

On the lower side of the sealing plate 22 on which the connection plug 20 is fixed, a sealed chamber for monitoring pressure 23 is hermetically installed in such a manner that the connection plug 20 is surrounded thereby. In the sealed chamber for monitoring pressure 23, an absorptive agent 24 is arranged.

The cylindrical supporting member 10 is connected electrically to the cylindrical member for medium-pressure space 32 on which the terminal fitting 17 is installed; the sealing plate 22 is connected to the sealed tank 37, which is grounded, to be at the ground potential. Accordingly, a connection between the medium-pressure space 18 and the sealed chamber for monitoring pressure 23 stated above is provided using the insulated pipe 19 made of insulating material, giving electrical insulation between them.

This connection makes the space created inside the bellows 8 of the vacuum valve 1 and the medium-pressure space 18 and the inside of the sealed chamber for monitoring pressure 23 be one continuous equi-pressure space.

In the sealed chamber for monitoring pressure 23 stated above, a pressure monitoring and controlling means that makes pressure-release control of the chamber corresponding with the predetermined setting value is provided. The pressure monitoring and controlling means includes, at least for example, a pressure measuring section that monitors the internal pressure of the sealed chamber for monitoring pressure 23 and an on-off valve that makes pressure-release control in response to the situation where the monitored internal pressure of the sealed chamber for monitoring pressure 23 has reached the predetermined setting value. Thus, the pressure-release control rendered by the pressure monitoring and controlling means opens the sealed chamber for monitoring pressure 23 to the atmospheric pressure to lower the internal pressure thereof.

To be more precise, as FIG. 1 illustrates, the pressure monitoring and controlling means includes a pressure monitor 27 that monitors the internal pressure of the medium-pressure space 18 stated above. Further, the pressure monitor 27 is connected to the sealed chamber for monitoring pressure 23 through a valve 25.

The pressure monitor 27 includes a pressure detector 26 that detects the internal pressure values of the sealed chamber for monitoring pressure 23 and of the medium-pressure space 18, an alarm device (not illustrated) that gives an alarm when the pressure detector 26 detects that the pressure has reached the predetermined alarming pressure value, and a solenoid valve 28 that opens the sealed chamber for monitoring pressure 23 to the atmosphere when the pressure detector 26 detects that the pressure has reached the predetermined abnormal pressure value. The valve 25 that connects the pressure monitor 27 with the sealed chamber for monitoring pressure 23 is normally open and the solenoid valve 28 is normally close.

Assume for example that the pressure of the insulating gas filled in the sealed tank 37 is 0.2 MPa, that the initial internal pressure value of the medium-pressure space 18 and the sealed chamber for monitoring pressure 23 is 0.1 MPa since their original state is open to the atmosphere, and that the alarming pressure value and the abnormal pressure value with the pressure monitor 27 are set in advance at 0.15 MPa and 0.2 MPa respectively. It however should be noted that these pressure settings may be changed if necessary.

Figure 3:
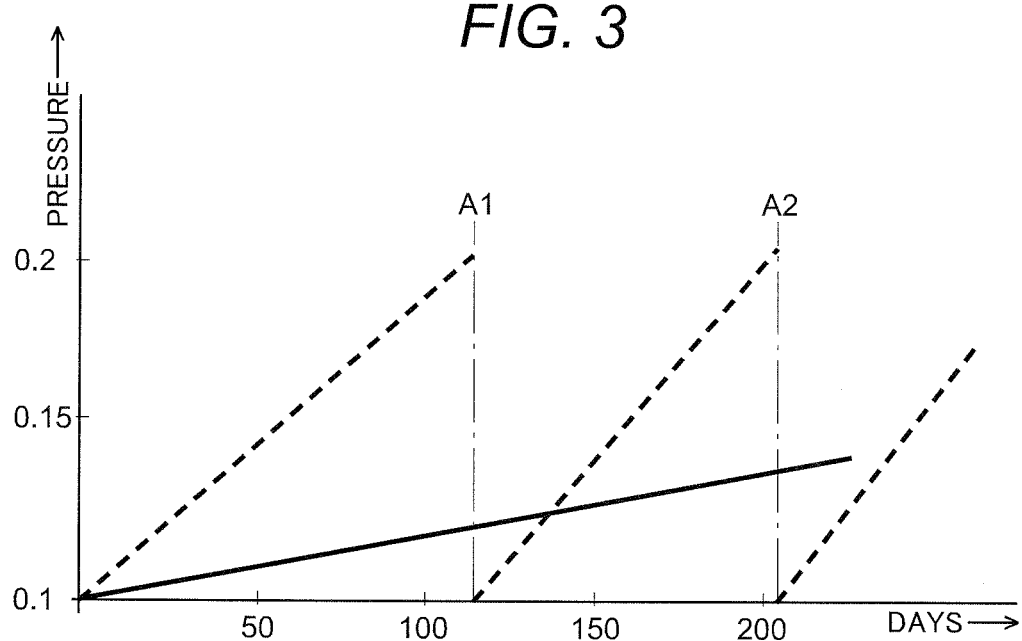
FIG. 3 is a graph that shows the relationship between the internal pressure of the sealed chamber for monitoring pressure caused by gas leakage thereinto and elapsed days.

In general, when the insulating gas in the sealed tank 37 slightly leaks into the medium-pressure space 18 through the gastight holding element that forms a part of the medium-pressure space 18, the internal pressure of the medium-pressure space 18 and the sealed chamber for monitoring pressure 23 behaves as shown in FIG. 3. To be more precise, there are two behaviors: a gradual pressure increase as indicated by the solid line due to the insulating gas leak from the gastight holding element, and a relatively larger leakage of the insulating gas as indicated by the broken lines due to the aging deterioration of the gastight holding element.

In the case where the pressure increases due to the leakage of the insulating gas as indicated by the broken lines in FIG. 3, the internal pressure of the sealed chamber for monitoring pressure 23 will reach the alarming pressure value of 0.15 MPa about 50 days later or a little later than that. In such situation, the pressure monitor 27 gives an alarm of the occurrence of gas leak through the alarm device (not illustrated) on detection of the internal pressure of the medium-pressure space 18 and the sealed chamber for monitoring pressure 23 reaching the alarming pressure value of 0.15 MPa by the pressure detector 26.

After that, when the gas pressure inside the medium-pressure space 18 and the sealed chamber for monitoring pressure 23 at the time point A1, where the elapse of days is about 100 days or little more than that as FIG. 3 indicates, reaches the abnormal pressure value of 0.2 MPa as a result of the development of the gas leak through that portion, the pressure monitor 27 will detect, using the pressure detector 26, that the pressure is the abnormal pressure value.

Then, the pressure monitor 27 sends a command of the pressure-release control to the solenoid valve 28 at the time point A1 indicated in FIG. 3 so that the solenoid valve 28 will open the sealed chamber for monitoring pressure 23 to the atmosphere. When the opening of the solenoid valve 28 restores the internal pressure of the sealed chamber for monitoring pressure 23 to the initial pressure value, the pressure monitor 27 sends a closing signal to the solenoid valve 28 to bring the solenoid valve 28 again to the shut state.

Similarly to the above, at other time points A2, etc. after A1 indicated in FIG. 3, the solenoid valve 28 repeats its control working of open-close movements being activated according to the pressure value examined by the pressure detector 26 that detects the internal pressure of the sealed chamber for monitoring pressure 23 in response to the command generated from the pressure monitor 27 that generates the pressure-release control command.

As the explanation stated above teaches, the internal pressure of the medium-pressure space 18 and the sealed chamber for monitoring pressure 23 is properly monitored by the pressure monitor 27 and maintained always at the value below the pressure of the insulating gas filled in the sealed tank 37.

This means that, as long as the gastight holding element that forms a part of the medium-pressure space 18 maintains a good gastightness, the internal pressure value of the medium-pressure space 18 and the sealed chamber for monitoring pressure 23 can be made always below the pressure of the insulating gas filled in the sealed tank 37.

Under this condition, the pressure difference applying on the bellows 8 is made to be smaller than that in the case where the medium-pressure space 18 is not provided; consequently the load on the bellows 8 is lightened with lengthened mechanical life.

In contrast, even when an increase in the internal pressure of the medium-pressure space 18 appears due to occurrence of a small leakage through the gastight holding element stated above, the pressure monitor 27 mentioned above lowers the internal pressure of the medium-pressure space 18 to the atmospheric pressure by opening the solenoid valve 28. Therefore, the time during which the difference between inner and outer pressure values applying on the bellows 8 is large is shortened by virtue of the medium-pressure space 18 being formed; consequently the load on the bellows 8 is lightened with lengthened mechanical life.

The solenoid valve 28 on the pressure monitor 27 is normally close, because the solenoid valve 28 is designed to work in case of abnormal pressure to open the medium-pressure space 18 to the atmosphere. Therefore, the room inside the sealed chamber for monitoring pressure 23 forms a normally-closed space. Further, even when the atmospheric air is introduced in the sealed chamber for monitoring pressure 23 on the pressure-release movement of the solenoid valve 28, the absorptive agent 24 provided in the sealed chamber for monitoring pressure 23 absorbs moisture in the atmospheric air effectively preventing the lowering of the insulation property attributable to the water-mixing.

In recent days, gas-insulated electrical apparatuses have come to replace their insulating gas with insulating gas other than SF6 or a mixed-gas for filling inside the sealed tank 37 in place of a conventional gas from the viewpoint of environmental concern. In these cases, the replacement of gas generally lowers the insulation property; this requires that the filling pressure should be increased more than before replacement. Therefore, the difference between inner and outer pressure value applying on the bellows 8 of the vacuum valve 1 increases more than the one in the case where the replaced gas of higher filling pressure works directly inside the bellows 8 of the vacuum valve 1.

However, forming the medium-pressure space 18 that is monitored by the pressure monitor 27 as stated above and setting the initial pressure value, the alarming pressure value, and abnormal pressure value of the medium-pressure space 18 at an appropriate value can suppress the difference between inner and outer pressure value applying on the bellows 8.

When dry air is used as the insulating gas for example, the pressure for filling into the sealed tank 37 will be made as high as 0.5 to 0.6 MPa whereas the one in the case of SF6 gas was 0.2 MPa. It is however enough to set again the alarming pressure vale and the abnormal pressure value of the pressure monitor 27 according to such filling pressure.

The gas-insulated vacuum circuit breaker by the present invention stated above includes: the sealed tank 37 filled with insulating gas; the sealed chamber for monitoring pressure 23 provided on the sealed tank 37; the connection using the insulated pipe 19 provided between the medium-pressure space 18 and the sealed chamber for monitoring pressure 23 in which the medium-pressure space 18 makes a medium pressure on the other surface of the bellows 8 on which vacuum pressure applies and in which the bellows 8 is provided for preventing the vacuum-leakage of the vacuum tank 2 attributable to the movement of the movable electrode 5; and the pressure monitoring and controlling means provided in the sealed chamber for monitoring pressure for monitoring the internal pressure thereof to activate the pressure-release control in response to the situation where the monitored internal pressure has reached the predetermined setting value. Further, as the pressure monitoring and controlling means, the gas-insulated vacuum circuit breaker by the present invention stated above includes the solenoid valve 28 that is capable of opening the sealed chamber for monitoring pressure 23 to the atmosphere, the pressure detector 26 that detects the internal pressure of the sealed chamber for monitoring pressure 23, and the pressure monitor 27 that activates the solenoid valve 28 for pressure-release when the pressure detector 26 detects that the internal pressure has reached the predetermined abnormal pressure value.

Thereby, if the internal pressure of the medium-pressure space 18 increases due to some reason, the internal pressure of the medium-pressure space 18 can be maintained at an intermediate pressure condition between the vacuum pressure of the vacuum tank 2 and the pressure of the insulating gas filled in the sealed tank 37, because the pressure inside the sealed chamber for monitoring pressure 23 can be released into the atmosphere by opening the solenoid valve 28. As a result of this, the difference in pressure applying on the bellows 8 is reduced and consequently the mechanical life thereof will be lengthened.

Further, because of that the connection is provided as stated above between the medium-pressure space 18 and the sealed chamber for monitoring pressure 23 using the insulated pipe 19, the medium-pressure space 18 on the vacuum valve 1 side and the and the sealed chamber for monitoring pressure 23 on the sealed tank 37 side can be arranged dispersedly. And consequently the axial dimension of the movable conductor shaft 6 in the medium-pressure space 18 will be shortened with a result of the down-sizing of the gas-insulated vacuum circuit breaker being practicable.

With this configuration, it becomes practicable to arrange the flexible conductor 16, which connects the movable conductor shaft 6 electrically, within the medium-pressure space 18. Therefore, there will not occur roughening or scratching the periphery of the movable conductor shaft 6 or the connecting shaft 13 by the current collector and no adverse effects in consequence thereof will be given to the maintaining of the gastightness of the medium-pressure space 18.

By virtue of this feature, the axial dimension of the movable conductor shaft 6 in the medium-pressure space 18 will be shortened with a result of the down-sizing of the gas-insulated vacuum circuit breaker being practicable. Further, the configuration enables the sealed chamber for monitoring pressure 23, which has a connection with the medium-pressure space 18, to be opened to the atmosphere through the solenoid valve 28 that is normally close. Thereby, in contrast with such a configuration that the sealed chamber for monitoring pressure 23 is normally open to the atmosphere, ingress of moisture in the atmospheric air is prevented and lowering in the insulation property attributable to the water-mixing is avoided. In a more preferable embodiment, the absorptive agent 24, which absorbs water, can be easily accommodated using the sealed chamber for monitoring pressure 23 of such fashion.

It however should be understood that the embodying configuration is not limited to such a configuration as illustrated in FIG. 2 provided that a connection is provided between the medium-pressure space 18 and the sealed chamber for monitoring pressure 23 using the insulated pipe 19 and the pressure monitoring and controlling means to be provided in the sealed chamber for monitoring pressure 23 monitors the internal pressure and makes the pressure-release control in response to the situation where the monitored internal pressure has reached the predetermined setting value.

INDUSTRIAL APPLICABILITY

The application of the gas-insulated vacuum circuit breaker explained above is not limited only to a configuration illustrated in FIG. 1 but also applicable to gas-insulated vacuum circuit breakers of other configurations.

The invention claimed is:
1. A gas-insulated vacuum circuit breaker comprising:
a sealed tank being filled with insulating gas;
a vacuum valve being arranged in the sealed tank, the vacuum valve including a movable electrode, a fixed electrode, a bellows, and a vacuum tank, and opening the movable electrode from the fixed electrode maintaining vacuum condition within the bellows;
a medium-pressure space being arranged in the sealed tank, the medium-pressure space applying pressure on one surface of the bellows that is the other surface of the bellows on which vacuum pressure being applied, the medium-pressure space being maintained to an intermediate pressure condition between the pressure of the insulating gas filled in the sealed tank and the vacuum pressure;
a sealed chamber for monitoring pressure being provided on the sealed tank to monitor the gas pressure;

an insulated pipe being installed between the sealed chamber for monitoring pressure and the medium-pressure space connecting therebetween; and a pressure monitoring and controlling means being installed in the sealed chamber for monitoring pressure, the pressure monitoring and controlling means monitoring the internal pressure thereof and controlling the internal pressure according to a predetermined setting value.

2. The gas-insulated vacuum circuit breaker according to claim 1, wherein the pressure monitoring and controlling means includes a solenoid valve, a pressure detector and a pressure monitor, the solenoid valve opening the sealed chamber for monitoring pressure to the atmosphere, the pressure detector detecting the internal pressure of the sealed chamber for monitoring pressure, the pressure monitor opening the solenoid valve when the pressure detected by the pressure detector reaches a predetermined abnormal pressure value.

\* \* \* \* \*